(12) United States Patent
Yamazaki et al.

(10) Patent No.: US 11,007,803 B2
(45) Date of Patent: May 18, 2021

(54) PRINTING APPARATUS AND DISTANCE MEASURING METHOD OF SONIC SENSOR

(71) Applicant: SEIKO EPSON CORPORATION, Tokyo (JP)

(72) Inventors: Shinya Yamazaki, Shiojiri (JP); Osamu Murayama, Higashichikuma-Gun Yamagta-Mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/779,891

(22) Filed: Feb. 3, 2020

(65) Prior Publication Data
US 2020/0247160 A1      Aug. 6, 2020

(30) Foreign Application Priority Data

Feb. 4, 2019   (JP) .............................. JP2019-017694

(51) Int. Cl.
| | | |
|---|---|---|
| *B41J 11/00* | (2006.01) | |
| *B41J 25/34* | (2006.01) | |
| *B41J 11/06* | (2006.01) | |
| *G01S 15/10* | (2006.01) | |

(52) U.S. Cl.
CPC .......... *B41J 25/34* (2013.01); *B41J 11/0095* (2013.01); *B41J 11/06* (2013.01); *G01S 15/10* (2013.01)

(58) Field of Classification Search
CPC ........ B41J 25/34; B41J 11/0095; B41J 11/06; G01S 15/10
See application file for complete search history.

(56) References Cited

U.S. PATENT DOCUMENTS

| | | | | |
|---|---|---|---|---|
| 2009/0073221 A1* | 3/2009 | Yoda | ................... | B41J 2/16511 347/33 |
| 2014/0192109 A1* | 7/2014 | Endo | ................... | B41J 11/0095 347/16 |
| 2016/0129708 A1 | 5/2016 | Sasaki | | |
| 2017/0129258 A1* | 5/2017 | Chiwata | ............... | B41J 11/0085 |
| 2017/0274418 A1* | 9/2017 | Shiode | .................. | B05D 3/007 |

FOREIGN PATENT DOCUMENTS

JP          2016-088022          5/2016

\* cited by examiner

*Primary Examiner* — Yaovi M Ameh
(74) *Attorney, Agent, or Firm* — Workman Nydegger

(57) ABSTRACT

A printing apparatus including a platen unit including a platen surface on which a medium is disposed; a carriage including a print head and a sonic sensor, the carriage being configured to move; and a flat surface unit including a plurality of flat surfaces disposed such that distances between the sonic sensor and the plurality of flat surfaces are different from each other. The printing apparatus derives a relational expression from a surface-by-surface distance difference among the flat surfaces of the flat surface unit and a transmission/reception time to and from each surface, obtained based on a measurement by the sonic sensor, and determines, from the relational expression and the transmission/reception time measured at the medium, a distance to the medium.

10 Claims, 6 Drawing Sheets

PRINTING APPARATUS AND DISTANCE MEASURING METHOD OF SONIC SENSOR

The present application is based on, and claims priority from JP Application Serial Number 2019-017694, filed Feb. 4, 2019, the disclosure of which is hereby incorporated by reference herein in its entirety.

BACKGROUND

1. Technical Field

The present technology relates to a printing apparatus configured to perform printing on a medium and a distance measuring method of a sonic sensor.

2. Related Art

In recent years, improvement in printing quality and printing efficiency of printing apparatuses is desired. In a so-called inkjet printing apparatus configured to discharge ink droplets to a medium from a print head, the distance between the medium and the print head has an important meaning in the printing quality. Specifically, in a case where wrinkles or floating occurs in the medium, the distance from the print head is changed from the original distance, and the hitting position of the ink droplets discharged from the print head is shifted, thus making it difficult to improve the printing quality. In view of this, typically, printing apparatuses include a detection unit configured to detect the distance between an appropriately set medium and the print head.

In the related art, a technique has been disclosed in which a detection unit configured to detect floating of a medium or the like in printing on the medium is provided for the purpose of reducing occurrence of failures in the printing (e.g., JP-A-2016-088022).

JP-A-2016-088022 discloses a printing apparatus including a conveyance unit configured to convey a medium to be printed, a print head configured to perform printing on the medium to be printed conveyed by the conveyance unit, a sonic distance sensor as the detection unit, an oscillation sensor configured to detect oscillations of the distance sensor, and a movement unit configured to move in a direction intersecting a conveyance direction of the medium to be printed, and with this configuration, the printing apparatus has a function of detecting floating of the medium to be printed.

In such a structure, however, the sonic sensor detects floating of the medium by measuring the distance from the medium, and as such, when the environment surrounding the sonic sensor has changed, the distance to the medium cannot be accurately measured. Sonic waves change depending on changes in the environmental condition such as temperature, humidity and pressure, and therefore when the print head is continuously used for a long period of time, the print head is heated and thus the use environment of the sonic sensor significantly changes. This may result in errors between the distance measured by the acoustic sensor and the actual distance.

SUMMARY

To solve the above-described problems, a printing apparatus according to the present disclosure includes a platen unit including a platen surface on which a medium is disposed, a carriage including a print head and a sonic sensor, the carriage being configured to move, and a flat surface unit including a plurality of flat surfaces that are located such that distances between the sonic sensor and the plurality of flat surfaces from are different from each other.

DESCRIPTION OF EXEMPLARY EMBODIMENTS

Figure 1:
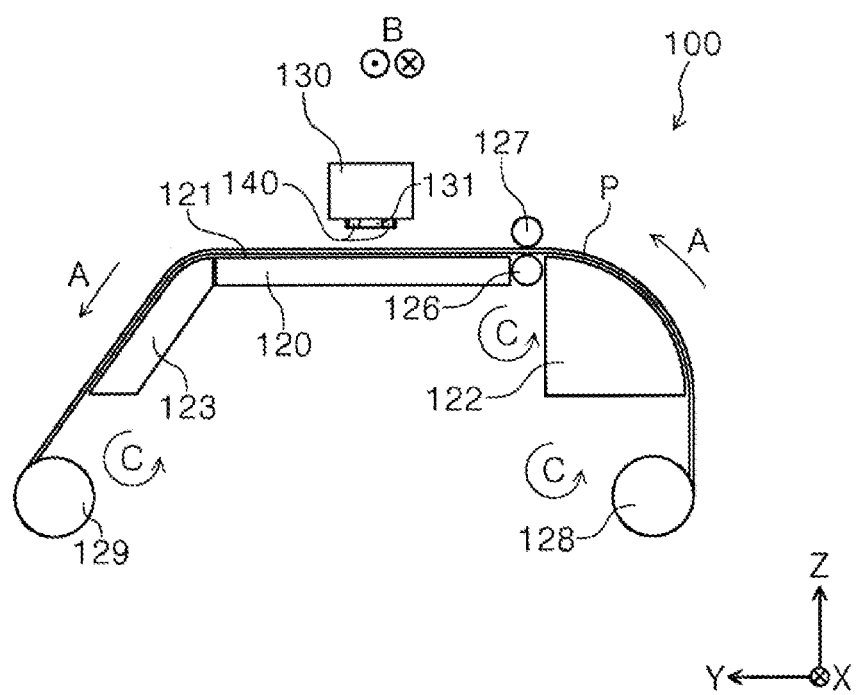
FIG. 1 is a schematic side view of a printing apparatus according to a first embodiment of the present disclosure.

First, an overview of the present disclosure is described.

A printing apparatus according to a first aspect of the present disclosure includes a platen unit including a platen surface on which a medium is disposed, a carriage including a print head and a sonic sensor, the carriage being configured to move, and a flat surface unit including a plurality of flat surfaces that are located such that distances between the sonic sensor and the plurality of flat surfaces are different from each other.

Here, while the flat surfaces of the surface unit are disposed such that distances between the sonic sensor and the plurality of flat surfaces are different from each other, the distance between one reference flat surface and each flat surface is precisely measured in advance and is known.

According to the present aspect, the printing apparatus includes the surface unit including the plurality of flat surfaces disposed such that their distances from the sonic sensor are different from each other, and thus can obtain the transmission/reception time to each flat surface of the flat surface unit on the basis of measurement of the sonic sensor of the carriage. Thus, from the transmission/reception time obtained by the sonic sensor and the known distance between one reference flat surface and each flat surface, a relational expression between the transmission/reception time and the distance under an environmental condition such as the temperature can be derived. Therefore, by using the value of the transmission/reception time obtained through measurement of the medium on the platen surface under an environmental condition similar to that environmental condition, the distance to the medium can be determined based on the above-mentioned relational expression with almost no influence of a change in the environmental condition such as the temperature.

In other words, the distance to the medium can be determined by determining the transmission/reception time through measurement of the medium on the platen surface by the sonic sensor under the environmental condition identical to the environmental condition under which the relational expression is obtained using the flat surface unit, and substituting the transmission/reception time into the relational expression.

In a printing apparatus according to a second aspect of the present disclosure in the printing apparatus according to the first aspect, the number of the plurality of flat surfaces of the flat surface unit, i.e., the flat surfaces that are disposed such that the distances from the sonic sensor are different from each other, is three or greater.

According to the present aspect, the printing apparatus includes three or more flat surfaces of the flat surface unit. Thus, a more reliable relational expression can be derived from the known distance of each flat surface from the sonic sensor and a plurality of the transmission/reception times.

In a printing apparatus according to a third aspect of the present disclosure in the printing apparatus according to the first aspect or the second aspect, the plurality of flat surfaces of the flat surface unit are located side by side, in a movement direction of the carriage in order of the distance from the sonic sensor from a farther flat surface to a closer flat surface.

According to the present aspect, the plurality of flat surfaces of the flat surface unit are disposed side by side in a movement direction of the carriage in order of the distance from the sonic sensor from a farther flat surface to a closer flat surface. Thus, the sonic sensor can measure the flat surfaces in descending order of the distance from the sonic sensor along with movement of the carriage. The plurality of flat surfaces are disposed side by side. Thus, the sonic sensor can measure the flat surfaces in a short travel distance. Thus, the relational expression can be efficiently derived.

In a printing apparatus according to a fourth aspect of the present disclosure in the printing apparatus according to any one of the first to third aspects, the flat surface unit is provided at the platen unit.

According to the present aspect, the flat surface unit is provided in the platen unit. Thus, the flat surface unit can be provided by machining the platen unit during the manufacture of the platen unit, for example. In other words, provision of additional components for providing the flat surface unit can be avoided. Thus, the flat surface unit can be easily provided.

In a printing apparatus according to a fifth aspect of the present disclosure in the printing apparatus according to any one of the first to fourth aspects, the flat surface unit is located outside a range where the medium is disposed.

According to the present aspect, the flat surface unit is located outside a range where the medium is disposed. That is, the medium disposed on the platen unit is not disposed on the flat surface unit. Thus, the flat surfaces can be used for measurement by the sonic sensor with the medium disposed on the platen surface even when printing of the medium is being performed by the print head. In other words, the relational expression can be efficiently derived.

In a printing apparatus according to a sixth aspect of the present disclosure in the printing apparatus according to any one of the first to fifth aspects, the flat surface, which is closest to the sonic sensor, of the flat surface unit is the platen surface on which to dispose the medium.

According to the present aspect, a flat surface closest to the sonic sensor in the flat surface unit is the platen surface on which to dispose the medium, and therefore it is not necessary to additionally provide that flat surface. In other words, there is no need for the space for that flat surface. Thus, the movement range of the carriage can be reduced, for example.

In a printing apparatus according to a seventh aspect of the present disclosure in the printing apparatus according to any one of the first to sixth aspects, the sonic sensor is disposed at a location that is further forward than the print head in a movement direction of the carriage.

According to the present aspect, the sonic sensor is disposed at a location forward of the print head in a movement direction of the carriage. Thus, for example, when the wrinkles of the medium are significant, the wrinkles of the medium can be detected by the sonic sensor before the wrinkles make contact with the print head. Thus, damage to the print head can be avoided by stopping the movement of the carriage.

In a printing apparatus according to an eighth aspect of the present disclosure in the printing apparatus according to any one of the first to seventh aspects, the sonic sensor is disposed at each of both ends of the print head in a direction orthogonal to a movement direction of the carriage.

According to the present aspect, the sonic sensor is disposed at both ends of the print head in a direction orthogonal to a movement direction of the carriage, and thus the wrinkles can be detected even when the wrinkles are generated at an end portion of the print head in a direction orthogonal to the direction in which the carriage moves. Thus, the contact of the wrinkles to the print head and the breakage of the print head can be avoided by stopping the movement of the carriage.

In a printing apparatus according to a ninth aspect of the present disclosure in the printing apparatus according to any one of the first to eighth aspects, a control unit is provided, and the control unit derives a relational expression between each of the distances and the transmission/reception time on the basis of the transmission/reception time to each flat surface obtained based on the measurement of the sonic sensor and the known distance between one reference surface and each flat surface, and calculates a distance to the medium based on the relational expression and an output from the sonic sensor in a state where the medium is disposed on the platen surface.

According to the present aspect, the control unit can accurately calculate the distance to the medium by using the relational expression, regardless of the propagation rate of the sonic wave through the measurement of the transmission/reception time to the medium using the sonic sensor in the state where the medium is disposed on the platen surface.

A distance measuring method of a sonic sensor according to a tenth aspect of the present disclosure uses the printing apparatus according to the ninth aspect, and includes a deriving step for deriving the relational expression between the a distance and the transmission/reception time, the transmission/reception time being obtained, based on a measurement by the sonic sensor, for each flat surface of the flat surface unit, and a calculating step for calculating a distance to the medium on based on the relational expression and the transmission/reception time to and from the medium, obtained based on the measurement by the sonic sensor.

According to the present aspect, an effect similar to that of the first aspect can be achieved.

Embodiments (FIG. 1)

Embodiments are described below with reference to the accompanying drawings. The following description is an exemplary case where the present disclosure is implemented, and the technical scope of the present disclosure is not limited to the following description. In the drawings, the same or similar elements or members are denoted with the same reference numerals, and redundant descriptions thereof are omitted.

First, a printing apparatus 110 according to a first embodiment is described with reference to FIG. 1.

The printing apparatus 110 of the present embodiment conveys a medium P in a conveyance direction A (+) from a sending unit 128 configured to send the medium P to a winding unit 129 for the medium P through a platen A122, a platen unit 120, and a platen B123, which are a support unit for the medium P. In other words, a path from the sending unit 128 to the winding unit 129 is a conveyance path of the medium P in the printing apparatus 110, and the platen 122A, the platen unit 120, and the platen B123 are the support unit of the medium P provided in the conveyance path. Note that the sending unit 128 rotates in a rotation direction C to send the medium P, and the winding unit 129 rotates in the rotation direction C to wind the medium P.

While the printing apparatus 110 of the present embodiment is configured to be capable of performing recording on a roll medium P, this configuration is not limitative, and a configuration capable of performing recording on a single-sheet medium P may also be adopted. In the case where a configuration in which recording can be performed on the single-sheet medium P is adopted, a so-called feed (sheet-feed) tray, feed (sheet-feed) cassette and the like are used as the sending unit 128 for the medium P, for example. In addition, as a collecting unit for the medium P, a so-called ejection reception unit, ejection (sheet-ejection) tray, ejection (sheet-ejection) cassette and the like are used as a collecting unit other than the winding unit 129, for example.

In the printing apparatus 110 of the present embodiment, a drive roller 126 is provided between the platen A122 and the platen unit 120, and a driven roller 127 is disposed above the drive roller 126. The conveyance unit 125 is composed of a pair of the drive roller 126 and the driven roller 127.

Note that in the present embodiment, since a roll medium P that is wound with a recording surface Pu facing outside is used, the sending unit 128 rotates the rotation shaft in the rotation direction C when the medium P is sent from the sending unit 128. In the case where a roll medium P wound with the recording surface Pu facing inside is used, the sending unit 128 rotates the rotation shaft in the direction opposite to the rotation direction C to send the medium P.

In the case where the winding unit 129 winds the medium P with the printing surface Pu facing outside, the winding unit 129 rotates the rotation shaft in the rotational direction C. In the case where the medium is wound with the printing surface Pu facing inside, the winding unit 129 rotates the rotation shaft in the direction opposite the rotation direction C to wind the medium P.

Here, in FIG. 1, the direction X and the direction Y are horizontal directions orthogonal to each other, and the direction Z is a vertical direction. In the printing apparatus 110 of the present embodiment, the conveyance direction A of the medium P on the platen surface 121 corresponds to the direction Y, and a movement direction B corresponds to the direction X.

Printing Apparatus

Next, the printing apparatus 110 of the present embodiment is described with reference to FIG. 2 and FIG. 3. Further, the printing apparatus 110 includes a control unit 150 described later (FIG. 4).

Figure 2:
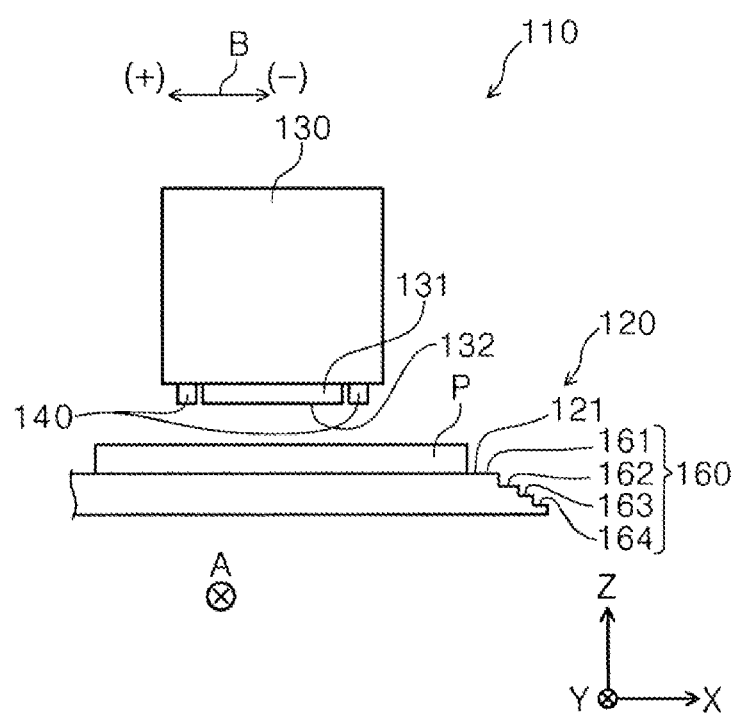
FIG. 2 is a schematic front view of the printing apparatus according to the first embodiment of the present disclosure.

FIG. 2 illustrates the platen unit 120 including a platen surface 121 on which to dispose the medium P, a carriage 130 including a print head 131 and a sonic sensor 140, and a flat surface unit 160 including a plurality of flat surfaces disposed such that their distances from the sonic sensor 140 are different from each other. The platen A122 and the platen B123 may internally include heaters not illustrated.

Flat Surface Unit

The flat surface unit 160 is composed of a plurality of flat surfaces whose distances from the sonic sensor 140 are different from each other, and each flat surface is measured by the sonic sensor 140.

In the present embodiment, the flat surfaces of the flat surface unit 160 are composed of a first flat surface 161, a second flat surface 162, a third flat surface 163, and a fourth flat surface 164. Each flat surface of the flat surface unit 160 is disposed such that each flat surface can be measured from the sonic sensor 140 that is moved by the carriage 130. Specifically, each flat surface of the flat surface unit 160 is geometrically perpendicular to the measurement direction of the sonic sensor 140.

Next, the flat surface unit 160 is described in detail with reference to FIG. 2 and FIG. 3.

In the present embodiment, the flat surfaces of the flat surface unit 160 are located in the order of the fourth flat surface 164, the third flat surface 163, the second flat surface 162, and the first flat surface 161 in descending order of the distance from the sonic sensor 140 when the carriage 130 moves in the movement direction B (+). By disposing the flat surfaces in descending order of the distance from the sonic sensor 140, the measurement can be performed in the order in which the sonic sensor 140 passes the flat surfaces when the sonic sensor 140 moves in the movement direction B (+). Further, by arranging the flat surfaces of the flat surface unit 160 in the order from the flat surface far from the sonic sensor 140 to the flat surface close to the sonic sensor 140, the ease of processing increases when the flat surface unit 160 is provided in the platen unit at the time of manufacture. Further, the flat surface unit 160 is formed as a single member. In other words, there is no seam or gap between the flat surfaces.

In the present embodiment, the flat surface unit 160 is provided in the platen unit 120. Thus, the flat surface unit 160 can be formed together with the platen unit 120 at the time of manufacture.

The flat surface unit may be provided at an end of the platen unit 120 in the movement direction B (−) or (+), or may be provided at both ends of the platen unit 120 in the movement direction B. For example, in the case where the movement range of the carriage 130 includes the standby position where the print head 131 is located outside the range of the medium P, the flat surface unit 160 may be provided between the standby position and the platen surface. In this manner, at the time of printing, the movement from the standby position to the medium P entails a passage through the flat surface unit 160, and thus the relational expression can be derived by measuring the flat surfaces of the flat surface unit 160.

In addition, when provided at both ends of the platen unit 120 in the movement direction B, the flat surfaces of the flat surface unit 160 can be measured by the carriage 130 at both ends of the platen surface 121 in the movement direction B for derivation of the relational expression.

In the present embodiment, the first flat surface 161 is the platen surface 121 on which to dispose the medium P. By providing the first flat surface 161 as a surface shared with the platen surface 121, the necessity to additionally provide the first flat surface 161 is eliminated. Thus, the necessity of the space for the first flat surface 161 is eliminated, and the space for the printing apparatus 110 can be further saved.

In addition, in the present embodiment, the flat surface unit 160 is provided outside the range in which the medium P is disposed.

Thus, each flat surface of the flat surface unit 160 can be measured without moving the medium P even during a printing operation.

Figure 5:
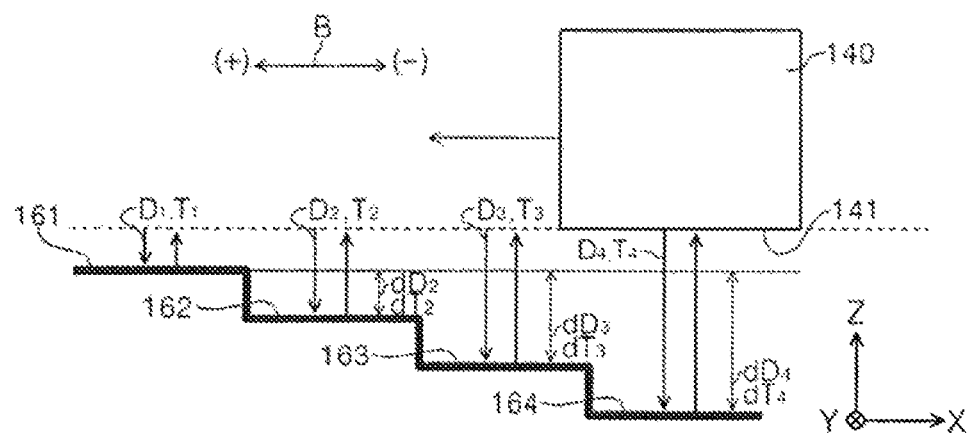
FIG. 5 is a schematic diagram illustrating a relationship between a sonic sensor and flat surfaces of flat surface unit.

As illustrated in FIG. 5, the flat surfaces of the flat surface unit 160 are disposed such that their distances from the sonic sensor 140 are different from each other. Further, the flat surfaces of the flat surface unit 160 are located such that the sonic sensor 140 passes through the fourth flat surface 164, the third flat surface 163, the second flat surface 162, and the first flat surface 161 in descending order of the distance from the sonic sensor 140 when the carriage 130 moves in the movement direction B (+). Specifically, the distances of the flat surfaces from the sonic sensor 140 are as follows. The distance to the first flat surface 161 is $D_1$, the distance to the second flat surface 162 is $D_2$, the distance to the third flat surface 163 is $D_3$, and the distance to the fourth flat surface 164 is $D_4$.

The distance ($D_2$-$D_1$) between the first flat surface 161 and the second flat surface 162, the distance ($D_3$-$D_2$) between the second flat surface 162 and the third flat surface 163, and the distance ($D_4$-$D_3$) between the third flat surface 163 and the fourth flat surface 164 are set to the same value in the present embodiment. The distances may not be set to the same value.

As illustrated in FIG. 5, a surface-to-surface distance $dD_1$, which is the difference between the distance D1 from the sonic sensor 140 to the first flat surface 161 and the distance from the sonic sensor 140 to each flat surface, is $dD_2$ in the second flat surface 162, $dD_3$ in the third flat surface 163, and $dD_4$ in the fourth flat surface 164. In other words, distances $dD_2$, $dD_3$ and $dD_4$, which are the distances of the flat surfaces 162, 163 and 164, respectively from the first flat surface 161 as one reference surface (161), have a relationship of $dD_2 < dD_3 < dD_4$.

Note that the flat surface unit 160 may be provided at the end of the platen unit 120 in the direction B (+), or may be provided at both ends.

While the number of the flat surfaces of the flat surface unit 160 is four in the present embodiment, the number of the flat surfaces of the flat surface unit 160 is not limited as long as the flat surface unit 160 is composed of a plurality of flat surfaces whose distances from the sonic sensor 140 are different from each other. Note that it is preferable to provide three or more surfaces.

The distances ($D_2$-$D_1$), ($D_3$-$D_2$), and ($D_4$-$D_3$) between flat surfaces 161, 162, 163 and 164 of the flat surface unit 160 are not limited as long as the distances are sufficiently greater than the resolution of the sonic sensor 140 and the machining accuracy of the flat surfaces of the flat surface unit 160. The distances ($D_2$-$D_1$), ($D_3$-$D_2$), and ($D_4$-$D_3$) between the surfaces are each 0.5 mm or 1 mm, for example.

The size of each flat surface of the flat surface unit 160 is not limited as long as the flat surface can be measured by the sonic sensor 140 moved by the carriage 130. When the flat surface is sufficiently large, the measurement can be performed at a plurality of points in one flat surface. Thus, for example, by setting the average of the distances measured at the plurality of points as the distance of the flat surface, it is possible to reduce the measurement error due to the machining accuracy of the flat surface and the like.

The positions of the flat surfaces of the flat surface unit 160 in the movement direction B and the distances $dD_2$, $dD_3$ and $dD_4$ of the flat surfaces from the reference flat surface (161) are provided in advance in the control unit 150 as known data. In particular, each of the distances $dD_2$, $dD_3$ and $dD_4$ is precisely measured in advance with a laser measuring machine or the like.

Figure 3:
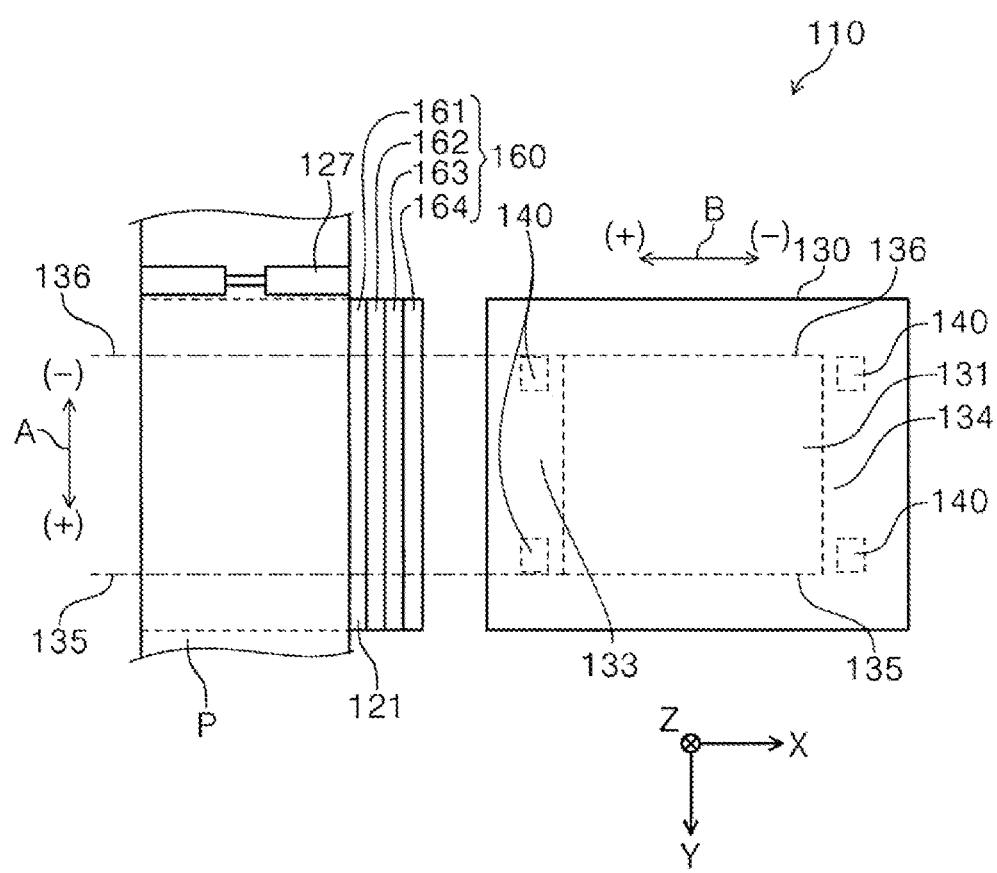
FIG. 3 is a schematic plan view of the printing apparatus according to the first embodiment of the present disclosure.
Figure 4:
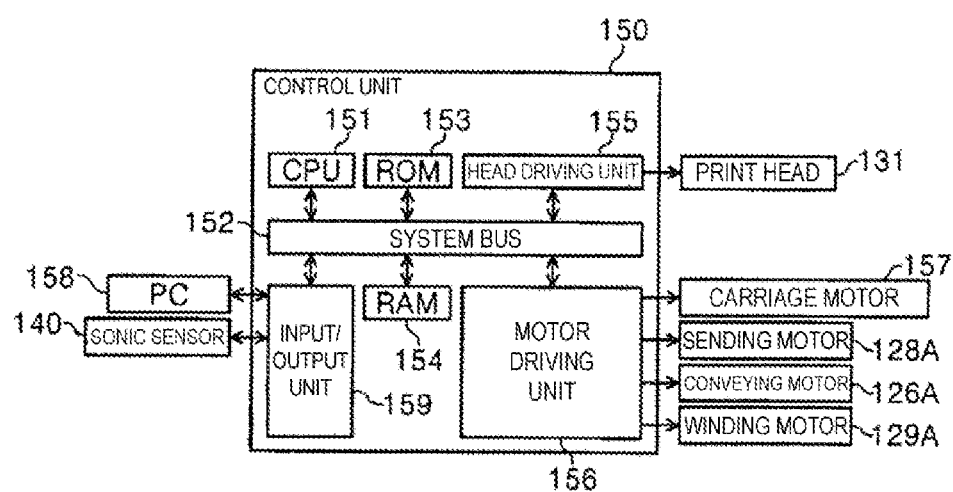
FIG. 4 is a block diagram of the printing apparatus according to the first embodiment of the present disclosure.

As illustrated in FIG. 2 and FIG. 3, the carriage 130 includes the print head 131 and the sonic sensor 140, and moves back and forth in the movement direction B. The medium P conveyed from the driven roller 127 side is disposed on the platen surface 121. The print head 131 is attached to the carriage 130 such that printing can be performed by discharging ink to the medium P. In addition, the sonic sensor 140 is attached to the carriage 130 such that the medium P can be measured.

As illustrated in FIG. 2 and FIG. 4, the carriage 130 is capable of moving back and forth in the movement direction B with respect to the platen surface 121. In addition, the carriage 130 can be moved with high positional accuracy by a carriage motor 157 (FIG. 4) that is driven into rotation on the basis of an instruction from the control unit 150 (described later). Thus, the print head 131 and the sonic sensor 140 can be moved to a given position of the medium P.

The carriage 130 moves back and forth by the carriage motor 157 that is driven into rotation on the basis of an instruction from a motor driving unit 156 through a linear-motion mechanism such as a rack-and-pinion mechanism and a pulley-and-belt mechanism, for example. The carriage motor 157 is not limited as long as the carriage motor 157 moves the print head 131 and the sonic sensor 140 with high positional accuracy. The carriage motor 157 is a so-called stepper motor that rotates by an amount based on the amount of a pulse sent from the motor driving unit 156, for example.

As a printing unit configured to perform printing on the medium P, the print head 131 is provided to the carriage 130 that moves with respect to the platen surface 121. On the basis of an instruction from the control unit 150, the printing apparatus 110 forms a desired image by discharging ink to the medium P from a discharging surface 132 (FIG. 2) of the print head 131 while moving the print head 131 back and forth in the movement direction B by the carriage 130.

After printing is performed in a certain region of the medium P by the print head 131, the medium P is delivered by a given length to the conveyance direction A (+) by the conveyance unit 125, and then printing is performed in the next region.

Sonic Sensor

As illustrated in FIG. 4, the sonic sensor 140 measures the medium P and the flat surface of the flat surface unit on the basis of an instruction from the control unit 150. The output from the sonic sensor 140 is sent to the control unit 150 via an input/output unit 159. The sonic sensor 140 may perform measurement at all times when the carriage 130 moves.

In FIG. 3, the sonic sensor 140 is attached to a forward position of the print head 131 in the movement direction B (+). Thus, the sonic sensor 140 can arrive at a position for measuring the medium P before the print head 131, and, therefore, when it is determined that there is wrinkles that make contact with the print head 131, the contact can be avoided by stopping the movement of the carriage 130.

In addition, since the sonic sensor 140 is disposed at a forward position 133 of the print head 131 in the movement direction B (+), the medium can be measured before ink droplets are discharged from the print head 131. Thus, the medium P can be measured before the ink is printed, and the risk of adhering of ink droplets to the sonic sensor 140 can be reduced.

Note that, further, the sonic sensor 140 may be disposed at a forward position 134 of the print head 131 in the movement direction B (−). When the sonic sensor 140 is disposed at a forward position of the print head 131 in the movement direction (−), wrinkles of the medium P can be detected before the arrival of the print head 131 even in the case where the carriage 130 moves in the movement direction B (−), and thus the above-mentioned effect can be achieved.

As illustrated in FIG. 3, in the present embodiment, the sonic sensor 140 is attached to positions 135 and 136 at both ends of the print head 131 in the conveyance direction A. As described above, the medium P may wrinkle over the entire region of the medium P in the conveyance direction A when conveyed from the driven roller 127 side. By attaching the sonic sensor 140 to both ends 135 and 136, such wrinkles can be more reliably detected.

Measurement Principle of Sonic Sensor

A measurement principle of the sonic sensor 140 is briefly described below.

Measurement with the sonic sensor 140 is performed by a so-called pulse-echo method. Specifically, on the basis of an instruction from the control unit 150, the duration between the time when the sonic wave is emitted from the piezoelectric transducer disposed at the tip end of the sonic sensor 140 and the time when the sonic wave is reflected by the object and received by the piezoelectric transducer is measured. That is, the transmission/reception time measured by the sonic sensor 140 includes a travelling time of the sonic wave to and from the object.

When the transmission/reception time is measured at a plurality of locations in one flat surface, it is preferable to set the average value of the measured transmission/reception times as the transmission/reception time to and from the flat surface, for example. In this manner, the measurement error of the transmission/reception time can be further reduced.

The transmission of the sonic waves from the piezoelectric transducer is performed by applying an alternating voltage to the piezoelectric transducer so as to deform the piezoelectric transducer, for example. Here, the piezoelectric transducer may deform in the thickness direction. In addition, the reception of the sonic wave at the piezoelectric transducer is performed by oscillating and deforming the piezoelectric transducer with the sonic wave. It is performed by converting the amount of the charge generated through polarization into a voltage value by a charge amplifier.

The output from the sonic sensor 140 is a transmission/reception time determined based on a change in the voltage value obtained by converting the amount of charge generated by the piezoelectric transducer into a voltage value by a charge amplifier.

The output from the sonic sensor 140 may be a distance calculated from the transmission/reception time and a relational expression. Note that the calculation expression in this case can be rewritten from the control unit 150.

Distance Measurement Using Sonic Sensor

Measurement of the distance using the sonic sensor 140 is typically performed through calculation in which ½ of the transmission/reception time is multiplied by the propagation rate of the sonic wave. However, while the sonic waves propagate by causing a change in density of the air as a medium, a propagation rate c of the sonic wave, which is defined as c=√ (heat capacity ratio·air pressure/medium density), changes depending on the air pressure and the air density. In other words, the air pressure and the air density largely change depending on the temperature and the humidity, and accordingly the propagation rate c of the sonic waves largely changes depending on the temperature and the humidity.

In a simplified form, the propagation rate c of the sonic waves in dry air is given as $c \approx 331.5 \times ((273+\theta)/273)$. Here, $\theta$ is the temperature (° C.). That is, even in dry air, the propagation rate of the sonic waves changes depending on the temperature. As a result, measurement errors occur in environments that entail significant changes as in the print head and the platen unit as described above.

In the present embodiment, for the purpose of preventing the above-described measurement errors, the distance is calculated using the relational expression from the transmission/reception time, regardless of the propagation rate of the sonic wave. Specifically, the transmission/reception time is measured for the known distance, and the relational expression between the transmission/reception time and the distance is derived, and, the distance is calculated using the relational expression from the transmission/reception time obtained through measurement of the object.

Control Unit

The control unit 150 having an electrical configuration in the printing apparatus 110 according to the present embodiment is described next with reference to FIG. 4.

The control unit 150 illustrated in FIG. 4 includes a CPU 151 that manages the entire control of the printing apparatus 110. The CPU 151 is coupled to a ROM 153 and a RAM 154 through a system bus 152. The ROM 153 stores various control programs, maintenance sequences and the like configured to be executed by the CPU 151. The RAM 154 can temporarily store data.

In addition, through the system bus 152, the CPU 151 is coupled to a head driving unit 155 for driving the print head 131.

In addition, the CPU 151 is coupled to the motor driving unit 156 through the system bus 152 and the motor driving unit 156 is coupled to the carriage motor 157 for moving the carriage 130, a sending motor serving as a driving source of the sending unit 128, a conveying motor serving as a driving source of the driving roller 126, and a winding motor serving as a driving source of the winding unit 129.

Further, the CPU 151 is coupled to an input/output unit 159 through the system bus 152, and the input/output unit 159 is coupled to the sonic sensor 140 and a PC 158 that is an external apparatus configured to input record data and the like into the printing apparatus 110.

The control unit 150 according to the present embodiment controls the printing apparatus 110. For example, when floating of the medium P is detected by the sonic sensor 140, a control of stopping the conveyance of the medium P, a control of stopping the movement of the carriage 130, and the like are performed.

In addition, on the basis of the known distance of each flat surface from one reference surface and the transmission/reception time of the flat surface unit 160 measured by the sonic sensor 140, the control unit 150 according to the present embodiment derives a relational expression between the transmission/reception time and the distance, and calculates the distance to the medium P from the measured transmission/reception time to the medium P and the relational expression.

The control unit 200 controls the entire printing apparatus 110.

Derivation of Relational Expression

Derivation of the relational expression between the transmission/reception time and the distance is described below with reference to FIG. 5.

FIG. 5 is a schematic view of a state where the sonic sensor 140 moves through the flat surfaces of the flat surface unit 160 for the measurement. In FIG. 5, the sonic sensor 140 measures the flat surfaces of the flat surface unit 160 while moving in the movement direction B (+).

As described above, the distances of the flat surfaces of the flat surface unit 160 from the sonic sensor 140 moved by the carriage 130 are $D_1$ in the first flat surface 161, $D_2$ in the second flat surface 162, $D_3$ in the third flat surface 163, and $D_4$ in the fourth flat surface 164.

In addition, as described above, the surface-to-surface distance $dD_i$, which is the difference in distance between the distance $D_1$ between the sonic sensor 140 and the first flat surface 161 and the distance of each flat surface from the sonic sensor 140, is $dD_2$ in the second flat surface 162, $dD_3$ in the third flat surface 163, and $dD_4$ in the fourth flat surface 164. Specifically, the relationships of the distances $dD_2$, $dD_3$ and $dD_4$ of the flat surfaces 162, 163 and 164 with the first flat surface 161 as one reference flat surface (161) are $dD_2=D_2-D_1$, $dD_3=D_3-D_1$ and $dD_4=D_4-D_1$, respectively, and $dD_2<dD_3<dD_4$ holds.

Here, it suffices that the distances $dD_2$, $dD_3$ and $dD_4$ are known, and the distances $D_1$, $D_2$, $D_3$, and $D_4$ of the flat surfaces of the flat surface units 160 from the sonic sensor 140 may not be known.

Here, the number of flat surfaces of the flat surface unit 160 may be greater than four. By increasing the number of flat surfaces of the flat surface unit 160, the relational expression can be derived based on a larger number of transmission/reception time differences and surface-to-surface distances, and thus the reliability of the relational expression can be increased.

Note that, in the case where the sonic sensor 140 is disposed at a position above the print head 131 such as a side surface of the carriage 130, each flat surface of the flat surface unit 160 may be provided above the platen surface 121 in the Z direction.

Transmission/reception times $T_i$ of the flat surfaces of the flat surface unit 160 measured by the sonic sensor 140 are $T_1$ in the first flat surface 161, $T_2$ in the second flat surface 162, $T_3$ in the third flat surface 163, and $T_4$ in the fourth flat surface 164. Transmission/reception time differences $dT_i$, each of which is a difference between the transmission/reception time measured at each flat surface and the transmission/reception time measured at the first flat surface, are $dT_2$ in the second flat surface, $dT_3$ in the third flat surface and $dT_4$ in the fourth flat surface. Here, $dT_2=T_2-T_1$, $dT_3=T_3-T_1$ and $dT_4=T_4-T_1$ hold.

The relational expression represents a relationship between a transmission/reception time and a distance. The relational expression is derived from ½ of the transmission/reception time differences $dT_2$, $dT_3$ and $dT_4$, which are differences in measured transmission/reception time to and from the flat surfaces 162, 163 and 164 of the flat surface unit 160 from the first flat surface 161, and the known distances $dD_2$, $dD_3$ and $dD_4$.

When the transmission/reception time T is an independent variable and the distance D is an explanatory variable, it is presumed that the distance D has a linear relationship with the transmission/reception time T, and therefore the relational expression can be expressed as the following linear function (1). Here, α represents the slope of D with respect to T, and β represents the D intercept.

$$D=\alpha/T+\beta \quad (1)$$

The method of deriving the relational expression is not limited as long as the method is a commonly used method. The relational expression may be derived by linear fitting with ½ of the transmission/reception time differences $dT_2$, $dT_3$ and $dT_4$ of the flat surfaces and the known distances $dD_2$, $dD_3$ and $dD_4$ of the flat surfaces of the flat surface unit 160. The relational expression may be derived by the least squares method, for example. The relationship may be obtained by simply dividing the known distances $dD_2$, $dD_3$ and $dD_4$ of the flat surfaces by ½ of the measured transmission/reception time differences $dT_2$, $dT_3$ and $dT_4$.

Figure 6:
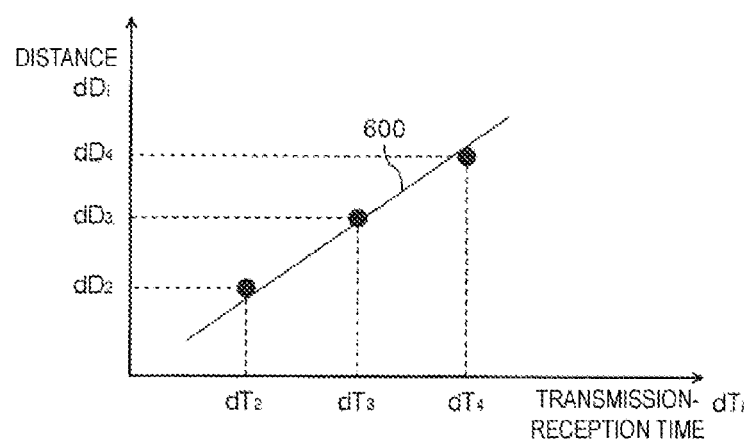
FIG. 6 is a graph illustrating a relationship between a transmission/reception time of sonic waves and distances of the flat surfaces of the flat surface unit.

FIG. 6 illustrates a scatter diagram of the known surface-to-surface distance $dD_i$ ($dD_2$, $dD_3$ and $dD_4$) of each flat surface of the flat surface unit 160 with respect to the first flat surface, and the measured transmission/reception time difference $dT_i$ of each flat surface. A straight line 600 illustrated in FIG. 6 represents a relational expression for estimating the distance D with respect to the transmission/reception time difference $dT_i$, and the relational expression is derived from the known surface-to-surface distance $dD_i$ (distances $dD_2$, $dD_3$ and $dD_4$) of each flat surface of the flat surface unit 160 with respect to the first flat surface and the measured transmission/reception time difference $dT_i$ of each flat surface with respect to the first flat surface.

Further, a correlation coefficient between the actually measured transmission/reception time dT and the surface-to-surface distance dD of the surfaces and the obtained relational expression may be calculated such that the transmission/reception time is again measured when the numerical value of the correlation coefficient is equal to or smaller than a predetermined value.

Calculation of Distance

A method of determining the distance to the medium P on the basis of the relational expression is described below.

The distance $D_P$ to the medium P is calculated by substituting ½ of the transmission/reception time Tp obtained through measurement of the medium P at the sonic sensor 140 into the derived relational expression (1).

In other words, when the transmission/reception time $T_{Pi}$ to the medium P measured by the sonic sensor 140 at the measurement position $P_i$ is substituted into the relational expression (1), the distance $D_{Pi}$ to the medium P at the measurement position Pi is $D_{Pi}=\alpha=T_{Pi}/2+\beta$.

Here, as described above, the measurement of the distance $D_P$ to the medium P may be performed at a plurality of measurement positions $P_i$ in the movement direction B of the medium P so as to average the values, or may be performed by conveying the medium P by a predetermined distance by the conveyance unit in the conveyance direction A, with the plurality of measurement positions of the medium P in the conveyance direction A as the measurement position $P_i$.

Distance Measuring Method of Sonic Sensor

A distance measuring method of the sonic sensor is described below as a second embodiment of the present disclosure.

The distance measuring method of the sonic sensor according to the present embodiment uses the printing apparatus 110 including the control unit 150, and includes a deriving step and a calculating step.

In the deriving step, the relational expression between the distance D and the transmission/reception time T obtained based on the measurement of each flat surface of the flat surface unit 160 by the sonic sensor 140 moved by the carriage 130 as described above.

In the calculating step, the distance $D_i$ to the medium P at each measurement position $P_i$ is calculated from the relational expression derived in the deriving step and the transmission/reception time $T_i$ obtained based on the measurement at each measurement position $P_i$ of the medium P by the sonic sensor 140 moved by the carriage 130, as described above.

Other Embodiments

As another embodiment of the present disclosure, the printing apparatus 110 may include a sensor carriage, not illustrated, including the sonic sensor 140 on the platen unit 120 side. Specifically, the sonic sensor 140 may measure the opposite surface of the printing surface Pu of the medium P through a slit provided along the movement direction B of the platen surface 121 by the sensor carriage of the platen unit 120. In this manner, the sonic sensor 140 measures the medium P from the opposite surface of the printing surface Pu, and thus the sonic sensor 140 is not affected by the ink printed on the medium P or the ink droplets discharged from the print head, for example. As a result, the medium P can be accurately measured and efficiently printed.

What is claimed is:

1. A printing apparatus comprising:
   a platen unit including a platen surface on which a medium is disposed;
   a carriage including a print head and a sonic sensor, the carriage being configured to move; and
   a flat surface unit including a plurality of flat surfaces that are located such that distances between the sonic sensor and the plurality of flat surfaces are different from each other,
   wherein the flat surface unit is formed as a single member such that there is no seam or gap between the plurality of flat surfaces.

2. The printing apparatus according to claim 1, wherein the number of flat surfaces constituting the flat surface unit is three or greater.

3. The printing apparatus according to claim 1, wherein the plurality of flat surfaces of the flat surface unit are located side by side, in a movement direction of the carriage, in order of the distance from the sonic sensor from a farther flat surface to a closer flat surface.

4. The printing apparatus according to claim 1, wherein the flat surface unit is provided at the platen unit.

5. The printing apparatus according to claim 1, wherein the flat surface unit is located outside a range where the medium is disposed.

6. The printing apparatus according to claim 1, wherein a flat surface, which is closest to the sonic sensor, of the flat surface unit is the platen surface.

7. The printing apparatus according to claim 1, wherein the sonic sensor is disposed at a location that is further forward than the print head in a movement direction of the carriage.

8. The printing apparatus according to claim 1, wherein the sonic sensor is disposed at each of both ends of the print head in a direction orthogonal to a movement direction of the carriage.

9. The printing apparatus according to claim 1, comprising a control unit, wherein the control unit derives a relational expression between each of the distances and a transmission/reception time obtained based on the sonic sensor, and calculates a distance to the medium based on the relational expression and an output from the sonic sensor in a state where the medium is disposed on the platen surface.

10. A distance measuring method of a sonic sensor using the printing apparatus according to claim 9, the method comprising:
    a deriving step for deriving the relational expression between the distance and the transmission/reception time, the transmission/reception time being obtained, based on a measurement by the sonic sensor, for each flat surface of the flat surface unit; and
    a calculating step for calculating a distance to the medium based on the relational expression and the transmission/reception time obtained, based on the measurement by the sonic sensor, for the medium.

* * * * *